US011170212B2

(12) United States Patent
Sengelaub et al.

(10) Patent No.: US 11,170,212 B2
(45) Date of Patent: Nov. 9, 2021

(54) SENSOR FUSION EYE TRACKING

(71) Applicant: Apple Inc., Cupertino, CA (US)

(72) Inventors: Tom Sengelaub, Sunnyvale, CA (US); Hua Gao, Sunnyvale, CA (US); Hao Qin, Sunnyvale, CA (US); Julia Benndorf, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 69 days.

(21) Appl. No.: 16/570,389

(22) Filed: Sep. 13, 2019

(65) Prior Publication Data

US 2020/0104589 A1    Apr. 2, 2020

Related U.S. Application Data

(60) Provisional application No. 62/738,431, filed on Sep. 28, 2018.

(51) Int. Cl.
*G06F 3/01* (2006.01)
*G06K 9/00* (2006.01)
(Continued)

(52) U.S. Cl.
CPC ......... *G06K 9/00604* (2013.01); *G06F 3/013* (2013.01); *G06T 7/50* (2017.01);
(Continued)

(58) Field of Classification Search
CPC .... G06K 9/00604; G06K 9/0061; G06T 7/74; G06T 7/50; G06T 7/90; G06T 2200/04;
(Continued)

(56) References Cited

U.S. PATENT DOCUMENTS 9,798,384 B2    10/2017    Strupczewski et al.
2014/0313308 A1 10/2014    Wang et al.
(Continued)

FOREIGN PATENT DOCUMENTS

WO    WO 2016142489    9/2016

OTHER PUBLICATIONS

David Beymer and Myron Flickner: "Eye Gaze Tracking Using an Active Stereo Head", 2003, Proceeings of the 2003 IEEE Computer Society Conference on Computer Vision and Pattern Recognition (CVPR'03). (Year: 2003).*

*Primary Examiner* — Siamak Harandi
(74) *Attorney, Agent, or Firm* — Thompson Hine LLP

(57) ABSTRACT

Some implementations of the disclosure involve, at a device having one or more processors, one or more image sensors, and an illumination source, detecting a first attribute of an eye based on pixel differences associated with different wavelengths of light in a first image of the eye. These implementations next determine a first location associated with the first attribute in a three dimensional (3D) coordinate system based on depth information from a depth sensor. Various implementations detect a second attribute of the eye based on a glint resulting from light of the illumination source reflecting off a cornea of the eye. These implementations next determine a second location associated with the second attribute in the 3D coordinate system based on the depth information from the depth sensor, and determine a gaze direction in the 3D coordinate system based on the first location and the second location.

20 Claims, 12 Drawing Sheets

(51) Int. Cl.
*G06T 7/73* (2017.01)
*G06T 7/50* (2017.01)
*G06T 7/90* (2017.01)

(52) U.S. Cl.
CPC .................. *G06T 7/74* (2017.01); *G06T 7/90* (2017.01); *G06T 2200/04* (2013.01); *G06T 2207/10024* (2013.01); *G06T 2207/10028* (2013.01); *G06T 2207/10048* (2013.01); *G06T 2207/30201* (2013.01)

(58) Field of Classification Search
CPC . G06T 2207/10024; G06T 2207/10028; G06T 2207/10048; G06T 2207/30201; G06F 3/013
See application file for complete search history.

(56) References Cited

U.S. PATENT DOCUMENTS

| | | | |
|---|---|---|---|
| 2015/0296135 A1 | 10/2015 | Wacquant et al. | |
| 2016/0202756 A1* | 7/2016 | Wu | G06F 3/013 382/103 |
| 2016/0202757 A1* | 7/2016 | Miao | H04N 5/33 348/78 |

* cited by examiner

SENSOR FUSION EYE TRACKING

CROSS-REFERENCE TO RELATED APPLICATION

This Application claims the benefit of U.S. Provisional Application Ser. No. 62/738,431 filed Sep. 28, 2018, which is incorporated herein in its entirety.

TECHNICAL FIELD

The present disclosure generally relates to remote eye tracking for electronic devices, and in particular, to systems, methods, and devices for providing remote eye tracking for electronic devices that move relative to the eye.

BACKGROUND

Related art eye tracking falls into two different types. The first type is mounted eye tracking that includes a sensor that physically moves dependently along with the user (e.g., eyeball). For example, a head mounted display (HMD) moves with user and can provide eye tracking. The second type of eye tracking is remote eye tracking that includes a sensor that physically moves with respect to the user (e.g., separate from or independently of the user). Some implementations of the second type of remote eye tracking use two infrared (IR) light sources (e.g., active illumination) separated by a minimum baseline distance to create separate cornea reflections (e.g., separate, detectable glints on the cornea). These remote eye tracking approaches know the extrinsic parameters of both (i) illumination and (ii) sensors. Existing computing systems, sensors and applications do not adequately provide remote eye tracking for electronic devices that move relative to the user.

SUMMARY

Various implementations disclosed herein include devices, systems, and methods that perform remote eye tracking for electronic devices that move relative to the user.

In some implementations, remote eye tracking determines gaze direction by identifying two locations in a 3D coordinate system along a gaze direction (e.g., a cornea center and a eyeball-rotation center) using a single active illumination source and depth information. In some implementations, a first location (e.g., the cornea center) is determined using a glint based on the active illumination source and depth information from a depth sensor and the second location (e.g., eyeball-rotation center) is determined using a RGB sensor (e.g., ambient light) and depth information. In some implementations, a single sensor using the same active illumination source determines the first location (e.g., the cornea center) and the second location (e.g., eyeball-rotation center), and the single sensor determines both depth information and glint information. In some implementations, remote eye tracking is provided by mobile electronic devices.

In some implementations, remote eye tracking determines a head pose in a 3D coordinate system, determines a position (e.g., eyeball rotation center) of the eye in the 3D coordinate system, and then identifies a spatial relationship between the head pose and the position of the eye. In some implementations, the spatial relationship is uniquely determined (e.g., user specific transformation). In some implementations, the spatial relationship is determined in an enrollment mode of remote eye tracking. Subsequently, in some implementations of a tracking mode of remote eye tracking, only feature detection images (e.g., RGB camera images) and the spatial relationship are used to perform remote eye tracking. In some implementations of a tracking mode of remote eye tracking, the depth information and active illumination are turned off (e.g., reducing power consumption).

One use of remote eye tracking is to identify a point of regard (POR) on a device in the direction of the user gaze, e.g., where the gaze direction intersects the display of the device. A POR can be used to facilitate user interaction with the device. For example, a system may detect that the users gaze has reached the bottom of the display and, in response, automatically scroll down to display more content to the user.

Some implementations of the disclosure involve, at a device having one or more processors, one or more image sensors, and an illumination source, detecting a first attribute of an eye based on pixel differences associated with different wavelengths of light in a first image of the eye. These implementations determine a first location associated with the first attribute in a three dimensional (3D) coordinate system based on depth information from a depth sensor. Various implementations detect a second attribute of the eye based on a glint resulting from light of the illumination source reflecting off a cornea of the eye. These implementations determine a second location associated with the second attribute in the 3D coordinate system based on the depth information from the depth sensor, and determine a gaze direction in the 3D coordinate system based on the first location and the second location.

Some implementations of the disclosure involve, at a device having one or more processors, one or more image sensors, and an illumination source, detecting a first attribute of an eye based on pixel differences associated with different wavelengths of light in a first image of the eye and determining a first location associated with the first attribute in a three dimensional (3D) coordinate system based on depth information from a depth sensor. Various implementations determine a head location in the three dimensional (3D) coordinate system based on a head (e.g., facial feature) detected in a second image and the depth information from the depth sensor. These implementations determine a second location associated with a second attribute of the eye based on the head location and a previously-determined spatial relationship between the head and the eye, and determine a gaze direction in the 3D coordinate system based on the first location and the second location.

Some implementations of the disclosure involve an electronic device that includes at least one active (e.g., IR) illumination source, a sensor configured to detect depth information in a first image and glints for cornea detection in a second image from reflections of light emitted by the at least one active illumination source, and one or more processors coupled to the active illumination source and the sensor to provide remote gaze tracking. Various implementations determine a first location associated with a first attribute detected in the first image in a three dimensional (3D) coordinate system based on the depth information. Various implementations determine a second location associated with the detected glints detected in the second image in the 3D coordinate system based on the depth information. In some implementations, the one or more processors determine a gaze direction in the 3D coordinate system based on the first location and the second location.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, an image sensor, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
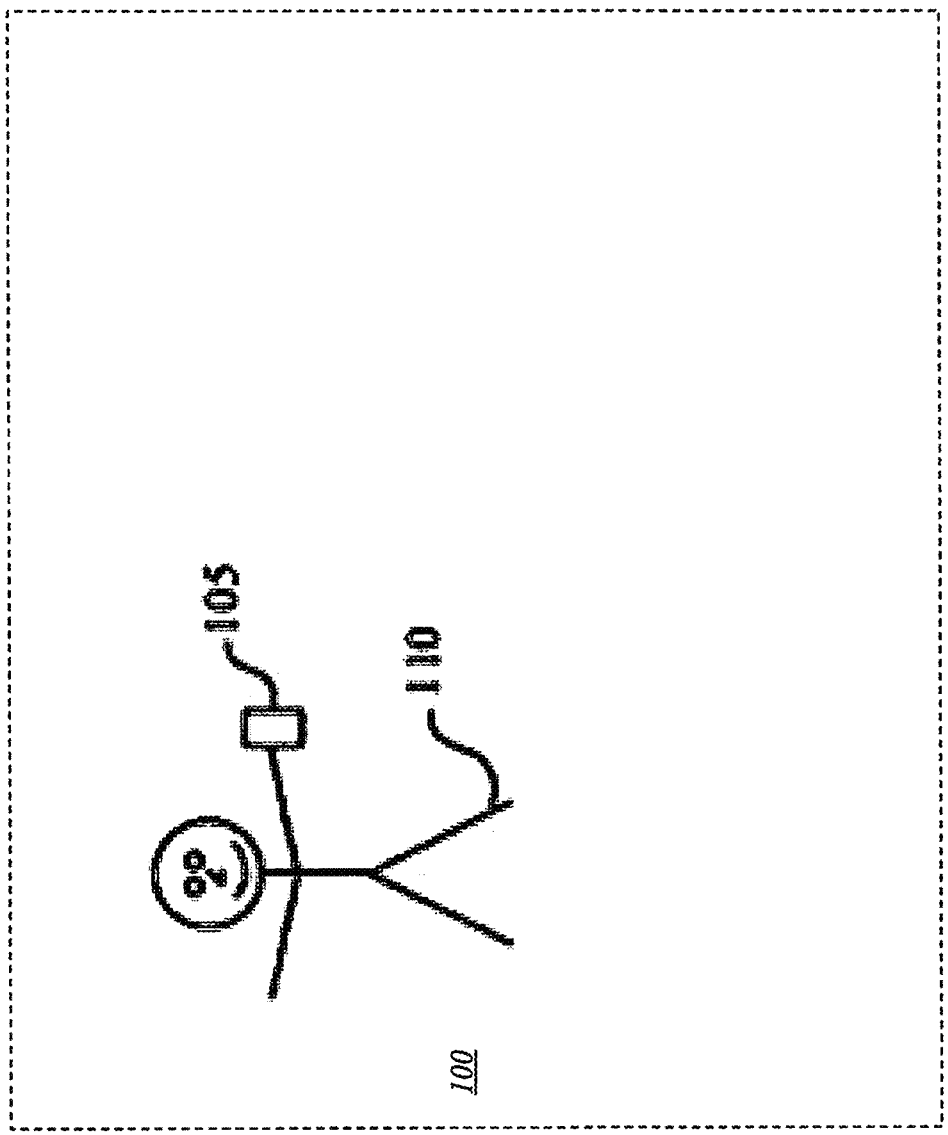
FIG. 1 is a block diagram of an example environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-systems, methods, components, devices and circuits have not been described in exhaustive detail so as not to obscure more pertinent aspects of the example implementations described herein.

Referring to FIG. 1, an example electronic device for implementing aspects of the present disclosure is illustrated. As shown in FIG. 1, an environment 100 includes an electronic device 105 being used by a user 110. The device 105 moves independently of the head of the user 110. In various implementations, the device 105 is configured with a plurality of sensors to perform remote eye tracking of user 110. As shown in FIG. 1, the user 110 has positioned the device 105 in the environment 100 for use where the face (e.g., one or both eyes) of the user 110 is visible to the device 105.

The device 105 can operate alone or interact with additional electronic devices not shown. The device 105 may communicate wirelessly or via a wired connection with a separate controller (not shown) to perform one or more functions. Similarly, the device 105 may store reference information useful for these functions or may communicate with a separate device such as a server or other computing device that stores this information. In some implementations, a device, such as the device 105 is a handheld electronic device (e.g., a smartphone or a tablet) configured to present various functions to the user 110.

Figure 2:
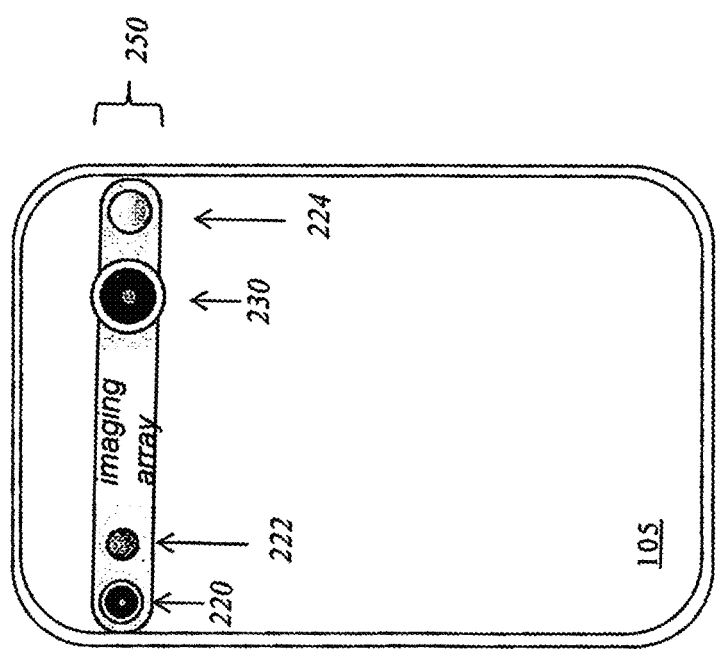
FIG. 2 is a block diagram of an electronic device including example sensors for remote eye tracking in accordance with some implementations.

FIG. 2 is a block diagram of an electronic device including example sensors for remote eye tracking in accordance with some implementations. As shown in FIG. 2, the electronic device 105 includes an imaging array 250. In various implementations, the imaging array 250 can be used for remote eye tracking. In some implementations, the imaging array 250 includes an infrared (IR) sensor 220, a first IR light source or projector (e.g., IR LED) 222, an RGB camera 230 and a second IR light source or projector 224 (e.g., DOT projector). In some implementations, the first IR light source 222 is an IR LED that operates for glint detection with the IR sensor 220. In some implementations, the first IR light source 222 is a flood IR light source. In some implementations, the second IR light source is a dot projector that projects 10,000, 20,000 or more than 30,000 IR dots for detection in an image of the IR sensor 220. In some implementations, the dot projector and IR sensor 220 jointly operate as a depth sensor. In some implementations, the RGB camera 230 is a RGB-D camera that sequentially generates both RGB images and depth images and operates as the depth sensor.

Figure 3:
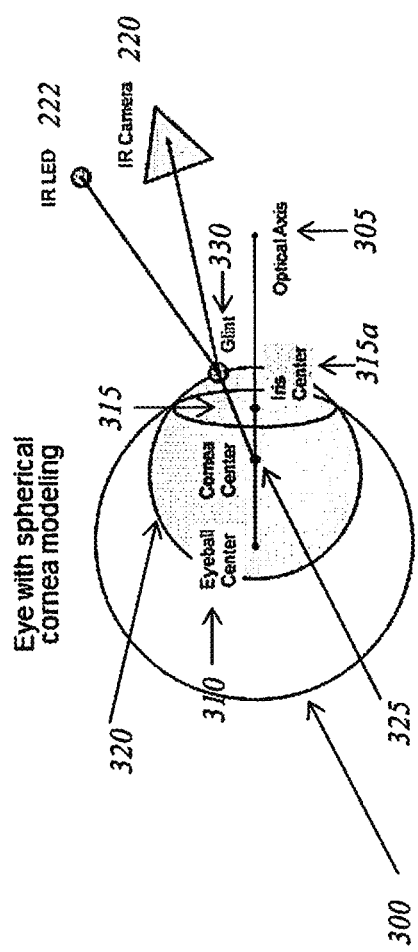
FIG. 3 is a block diagram depicting a 3D representation of an eyeball to illustrate an example eyeball modeling implementation assisting in remote eye tracking.

FIG. 3 is a block diagram depicting a 3D representation of an eyeball to illustrate an example eyeball modeling implementation for remote eye tracking. While the cornea is the transparent front part of the eye that covers the iris, pupil, and anterior chamber, as shown in FIG. 3, the 3D representation of an eyeball 300 uses a spherical model of a cornea 320. Other 3D representations of the cornea can alternatively be used. In some implementations, an eyeball model is generated independently or uniquely for each subject. As shown in FIG. 3, the 3D representation of the eyeball 300 shows an optical axis 305. In some implementations, the optical axis 305 corresponds to a gaze direction of the eye 300.

In some implementations, estimating the gaze direction of the eye is based on determining two locations on the optical axis 305. Some implementations determine a 3D spatial position of the iris center 315a and a 3D spatial position of a cornea center 325 as the two locations on the optical axis 305. Some implementations determine a 3D spatial position of the eyeball rotation center 310 and a 3D spatial position of the cornea center 325 as the two locations on the optical axis 305. The two positions can be determined based on information from various sensors on a device, known relative spatial positions of those sensors (e.g., extrinsic parameters of IR LED 222 and IR sensor 220 reflecting their positional characteristics are known), and generic or user-specific eye models.

In some implementations, a position of the iris center 315a is determined based on identifying spatial attributes of the iris. For example, the 3D spatial position of the iris (e.g., a iris plane 315, iris boundary (not shown), etc.) may be determined using one or more RGB images of the eye and depth values from a depth map corresponding to the RGB images. The iris center 315a may then be determined based on the spatial attributes of the iris and a generic or user-specific eye model.

In some implementations, a position of the eyeball rotation center 310 is determined based on identifying spatial attributes of the iris. For example, the 3D spatial position of the iris may be determined using one or more RGB images of the eye and depth values from a depth map corresponding to the RGB images. The rotation center of the eyeball 310 may then be determined based on the spatial position of the iris.

In some implementations, a position of the eyeball rotation center 310 is determined based on identifying spatial attributes of the limbus (e.g., limbus center). For example, the 3D spatial position of the limbus may be determined using one or more RGB images of the eye and depth values from a depth map corresponding to the RGB images. In some implementations, given 2D images of the limbus and a previously determined limbus model, the position or orientation of the limbus may then be determined. The rotation center of the eyeball 310 may then be determined based on the spatial position of the limbus.

In some implementations, a position of the eyeball rotation center 310 is determined based on identifying spatial attributes of a head of the user. For example, the 3D spatial position of the head may be determined using one or more RGB images of the eye and depth values from a depth map corresponding to the RGB images. Given a previously determined spatial relationship between the head and the eyeball rotation center 310, the position of the eyeball rotation center 310 may then be determined.

In some implementations, a position of the cornea center 325 is determined based on identifying spatial attributes of the cornea 320. For example, the 3D spatial position of the cornea (e.g., the depths/locations of one or more glints 330 on the surface of the cornea) may be determined using a sensor (e.g., a sensor configured to detect glints generated from an illumination source on the device). The position of the cornea center 325 may then be determined based on the spatial position of the cornea and a cornea model.

Figure 4:
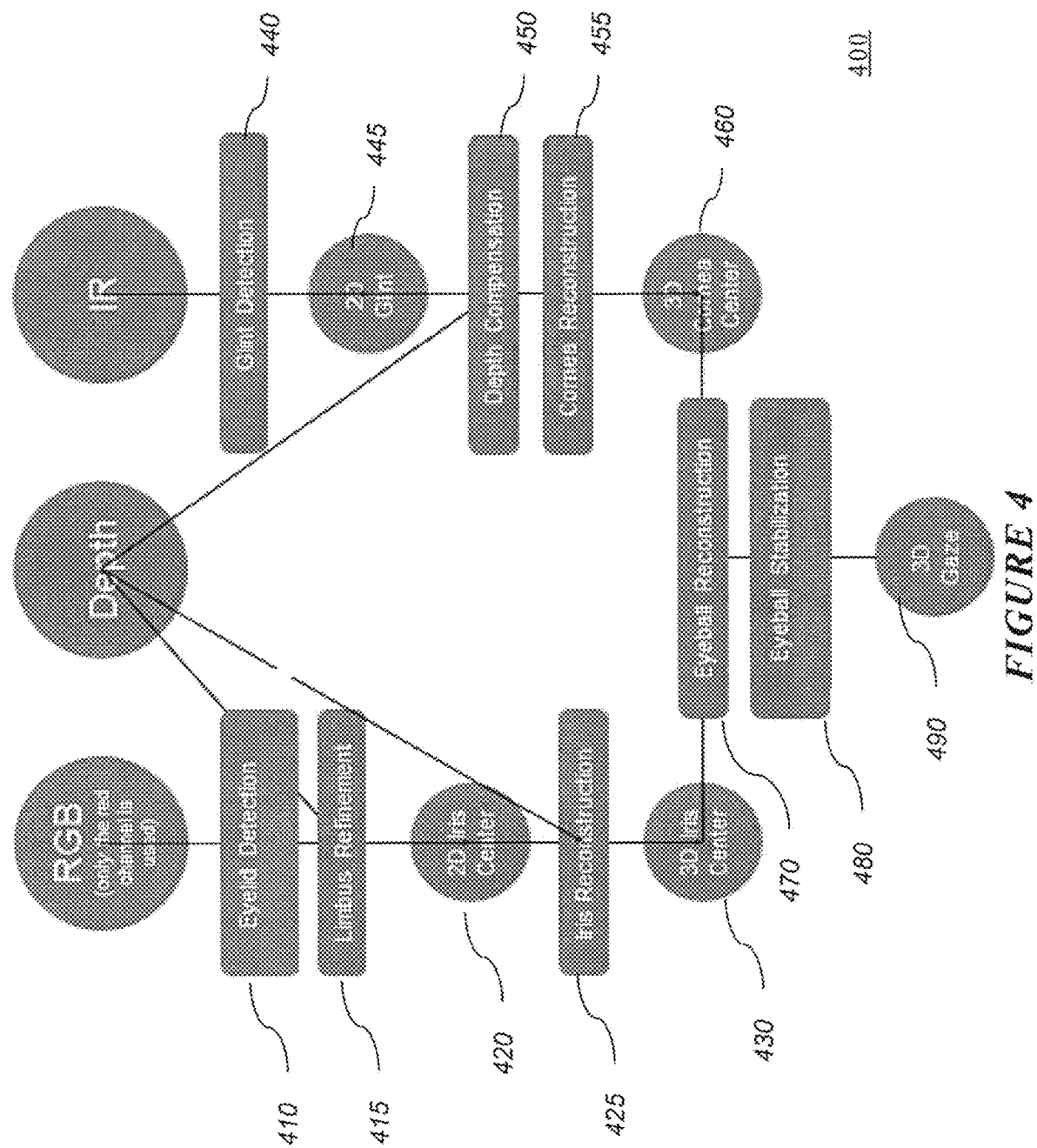
FIG. 4 is a flowchart showing an example method for remote eye tracking in accordance with some implementations.

FIG. 4 is a flowchart showing an example method 400 for remote eye tracking in accordance with some implementations. As shown in FIG. 4, an imaging array includes sensors that obtain RGB images (e.g., an RGB sensor), depth images (e.g., a depth sensor), and IR images (e.g., an IR sensor).

In some implementations, the method 400 determines a gaze direction by identifying a first location along the optical axis 305 (e.g., eyeball rotation center 310) and a second location along the optical axis 305 (e.g., cornea center 325).

At block 410, the method 400 detects an eyelid to detect the eye region. In some implementations, facial landmarks are detected in one or more RGB images and used to locate the eye region. In some implementations, facial landmarks are detected using a single color of the RGB images. Alternatively, a face recognition application can be used to identify an eye region using facial landmarks. In some implementations, the facial landmarks include eyelid detection. In some implementations, the facial landmarks include limbus detection. In some implementations, the facial landmarks include iris detection.

At block 415, the method 400 uses a predetermined mapping established between the RGB camera and the depth sensor. Therefore, once the eye region is detected in the RGB images, the corresponding portion of a depth map can be accessed to acquire specific depth values for the eye region. In some implementations, the RGB camera is a RGB-D camera that alternates acquisitions of RGB images and depth images. For example, values for a limbus detected within the eye region using the RGB images can be retrieved and refined with the depth information from the depth map of the depth sensor.

At block 420, the method 400 determines a 2D Iris center using RGB images. In some implementations, the 2D Iris center can be determined using the limbus information (e.g., position or depth).

At block 425, the method 400 performs an Iris reconstruction or generates a model of an Iris plane. For example, based on the Iris center, the Iris plane 315 can be detected and depth values for the Iris plane 315 can be determined and used to reconstruct the Iris plane 315. At block 430, the method 400 determines a 3D center 315a of the Iris plane 315. From the 3D Iris plane center 315a, the eyeball rotation center 310 can be determined.

In some implementations, the eyeball rotation center 310 is the first location on the optical axis 305.

At block 440, the method 400 detects glints 330 in 2D IR images, and at block 445, the method uses the 2D glint images to detect a cornea of the eyeball.

At block 450, the method 400 uses the existing mapping established between the IR sensor and the depth sensor so that once the glints 330 are detected, the corresponding portion of the depth map can be accessed to acquire specific depth values for the glints 330. In some implementations, the IR sensor 220 is a single IR sensor that alternates acquisitions of 2D glint images and IR depth images.

At block 455, the method 400 performs an cornea reconstruction. For example, depth values for the cornea 320 can be used to establish a 3D model of the cornea 320. As shown in FIG. 3, the 3D reconstruction of the cornea 320 is a spherical representation, however, other 3D representations can be used. In some implementations, the 3D model of the cornea will be different for every person. In some implementations, multiple 3D models of the cornea 320 can be used where each model is standardized for groups of individuals.

At block 460, the method 400 determines a 3D cornea center position 325. In various implementations, glints 330 detected by the IR sensor are used with the cornea model at block 460 to establish an orientation of the cornea 320. For example, parameters of a LED IR source 222 and an IR camera 220 are known. Glints 330 detected in IR images from the IR camera 220 can be used to determine the orientation of the cornea 320, which is then used to determine a 3D cornea center position 325. Thus, in some implementations, glints are detected and used with correlated depth information to determine the 3D cornea center position 325 with the 3D model of the cornea 320.

In some implementations, the 3D cornea center position 325 is the second location on the optical axis 305.

At block 470, the method 400 can perform an eyeball reconstruction to establish a transformation from head pose to eyeball rotation center corresponding the user-specific positioning of the eyeball 300 in each user's head. Once the transformation is determined, detecting a current head pose can directly result in an updated current eyeball rotation center position. In some implementations, a transformation from a head pose to the eyeball rotation center is determined (e.g., when operating in an enrollment mode of the device 105) in block 470. In some implementations, the relationship between the head pose and the eyeball center will be different for every person.

In some implementations, an enrollment mode of remote eye tracking of the device 105 establishes the transformation between the head pose and eyeball rotation center 310 using a single active illumination source (e.g., a single source for glints) and a depth sensor. In some implementations, the tracking mode of remote eye tracking of the device 105 turns off the active illumination source for glints and the depth sensor and uses the transformation from a head pose to the eyeball rotation center along with a facial feature detection sensor (e.g., RGB images). In some implementations, the tracking mode of remote eye tracking avoids the repeated detection of the specific 3D spatial eyeball rotation center 310 position (and the manner in which it is calculated, for example blocks 420-430), once the transformation between the head pose and eyeball rotation center 310 is established.

At block 480, the method 400 can optionally optimize the 3D model of the cornea, the 3D model of the facial feature (e.g., Iris plane) and the transformation between head pose and the first location on the optical axis for stabilization or the like.

At block 490, the method 400 determines the 3D gaze direction by detecting a 3D eyeball rotation center position 325 and detecting a 3D cornea center position 310. Alternatively, at block 490, the method 400 determines the 3D gaze direction from the detected head pose and the transformation to calculate the 3D eyeball rotation center position 325 and the detected 3D cornea center position 310.

For remote eye tracking applications of the device 105, various implementations of image sensor arrays or imaging systems can be used. In some implementations, various implementations of image sensor arrays can be used in an enrollment mode of remote eye tracking and a tracking mode of remote eye tracking of the device 105.

Figure 5A:
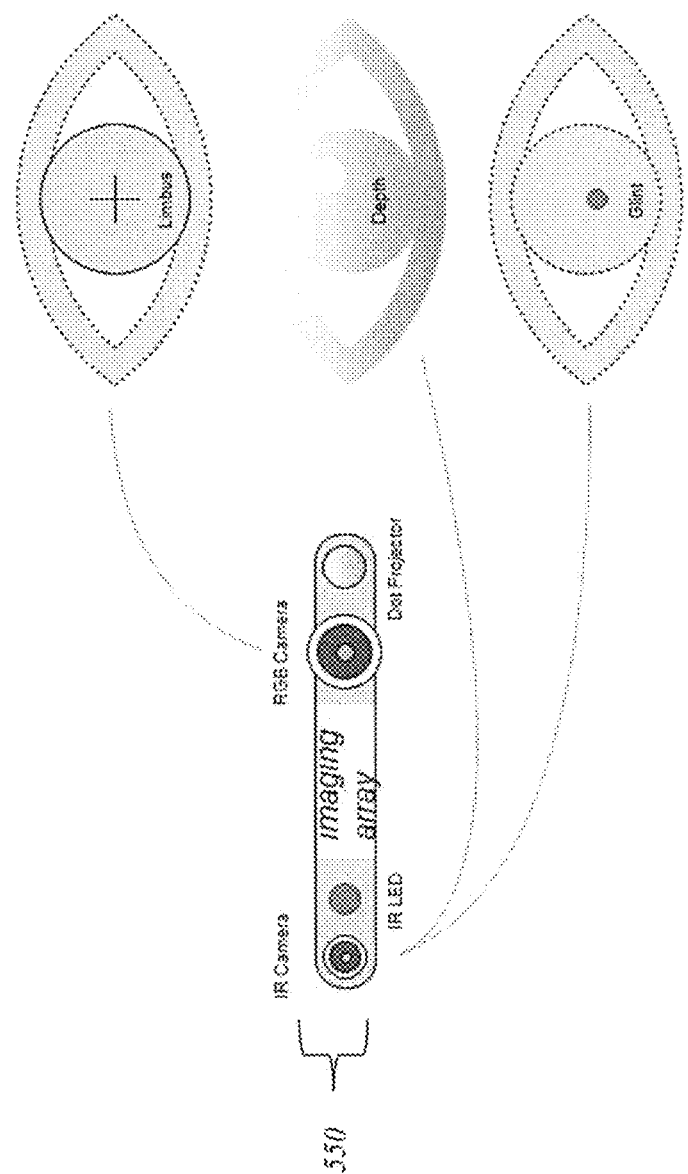
FIGS. 5A-5B are block diagrams that show example imaging arrays used to collect information for remote eye tracking in an electronic device in accordance with some implementations.

FIG. 5A is a block diagram that shows an example imaging array used to collect RGB information, IR information and depth information for remote eye tracking in an electronic device in accordance with some implementations. As shown in FIG. 5A, the device 105 uses an imaging array 550 that includes an IR LED, an IR camera, an RGB camera, and a IR dot projector. The IR LED and IR camera provide glint detection using 2D IR images. The RGB camera uses ambient light for eyeball feature detection or head pose detection. Some implementations use ambient light, and accordingly, may not work well in dark environments. In some implementations, the RGB camera can use a known marker placed on the user to augment head pose detection with ambient light. The IR dot projector and the IR camera provides depth information using 2D IR images.

Figure 5B:
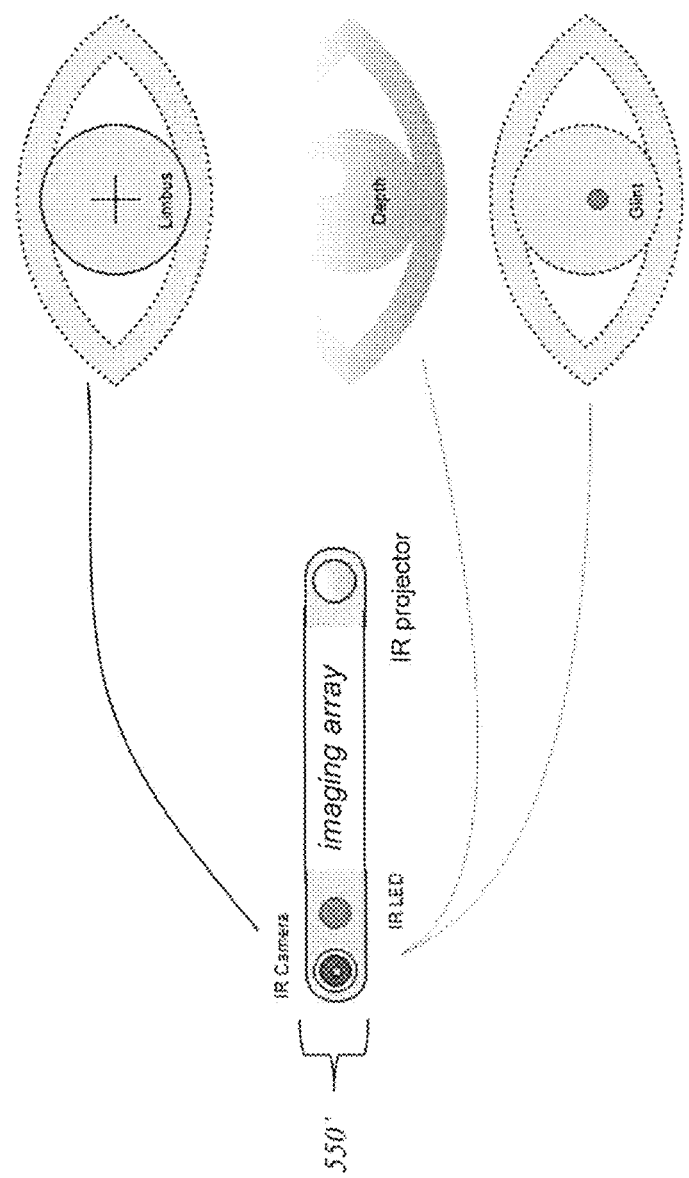

FIG. 5B is a block diagram that shows another example imaging array used to collect IR information for remote eye tracking in an electronic device. As shown in FIG. 5B, only IR sensors are used in imaging array 550'. In some implementations, only a single IR sensor is used. In some implementations, the IR camera uses wavelength detection to determine facial feature location (e.g., head pose detection). In some implementations, the IR camera uses structured light imaging to determine depth information and facial feature location (e.g., head pose detection). The structured light imaging of the IR camera may need sufficient resolution. In some implementations, the IR camera uses dot projection imaging to determine depth information. The IR LED and IR camera provide glint detection using 2D IR images. In some implementations, the IR sensor alternates over time by firstly capturing depth information using light emitted from the illumination source and secondly capturing IR images of glints for cornea detection using flood illumination that reflects off the cornea. Alternatively, the IR sensor can concurrently capture depth information and IR images of glints for cornea detection using light emitted from the illumination source that reflects off the cornea. In one implementation of concurrent capture, the glints are detected within the images of reflected structured light patterns captured by the IR sensor. Thus, the IR sensor is used to both determine the first location on the optical axis (e.g., detect each 3D spatial position of the eyeball center, or determine the eyeball center transformation and detect the head pose) and determine the second location on the optical axis (e.g., determine the cornea center). However, upon a transition to tracking mode of remote eye tracking, the imaging array 550' can turn off IR flood illumination, and ignore or turn off depth information acquisition. In some implementations, the tracking mode of remote eye tracking can use the IR structured light pattern to determine the head pose and then the feature detection (e.g., limbus detection) to provide a current second location or estimate a current 3D position of the cornea center. As there is little IR illumination in ambient light, the IR structured light imaging may be needed with or without ambient light.

One use of remote eye tracking is to identify a point of regard (POR) of a gaze on a display on the device 105, e.g., where the gaze direction intersects the display of the device 105. The POR may or may not be graphically identified on the display. In various implementations, the POR can be distinguished from other content using a marker or other indication having distinguishing color, illumination, or shape.

A POR can be determined based on eye position and gaze direction, for example, based on a 5D pose determination of the eye that includes a 3D position (eye position) and 2D orientation (corresponding to gaze direction). The gaze direction can be mapped to intersect a known location of the device 105. In other words, the POR is determined to be the location on the device where the determined gaze direction intersects the device 105 in space. The POR can be displayed or used to facilitate interaction with one or more functions on the device 105. In some implementations, defined or preset movements of the POR at the display of the device 105 are interpreted as operator instructions. For example, a vertical or linear movement of the POR on the device 105 can mimic a physical "swipe" operation of a fingertip on the display of the device 105. Similarly, lingering the POR at a specific selection position for a preset time such as 2 seconds can mimic a "single tap" select operation of a fingertip on the display of the device 105. Other user "physical" operations or interactions with the device 105 can also be implemented using the POR.

Figure 6:
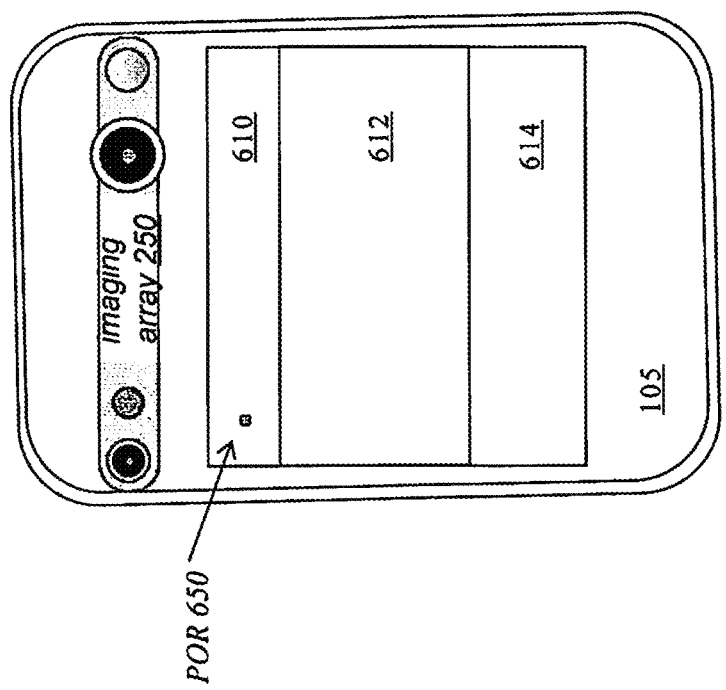
FIG. 6 is a block diagram of an electronic device where remote eye tracking provides point of regard (POR) display at the electronic device in accordance with some implementations.

FIG. 6 is a block diagram of an electronic device where remote eye tracking provides POR display at the electronic device in accordance with some implementations. As shown in FIG. 6, an imaging array 250 at the electronic device 105 provides remote eye tracking capability. Additional functions 610, 612 and 614 being operated are accessible in a visible top surface of the electronic device 105. When the determined gaze direction intersects the device 105 in space, a POR 650 can be displayed at the intersected location on the device 105. The POR 650 can be used to interact with one or more functions 610, 612, 614 of the electronic device 105.

Figure 7:
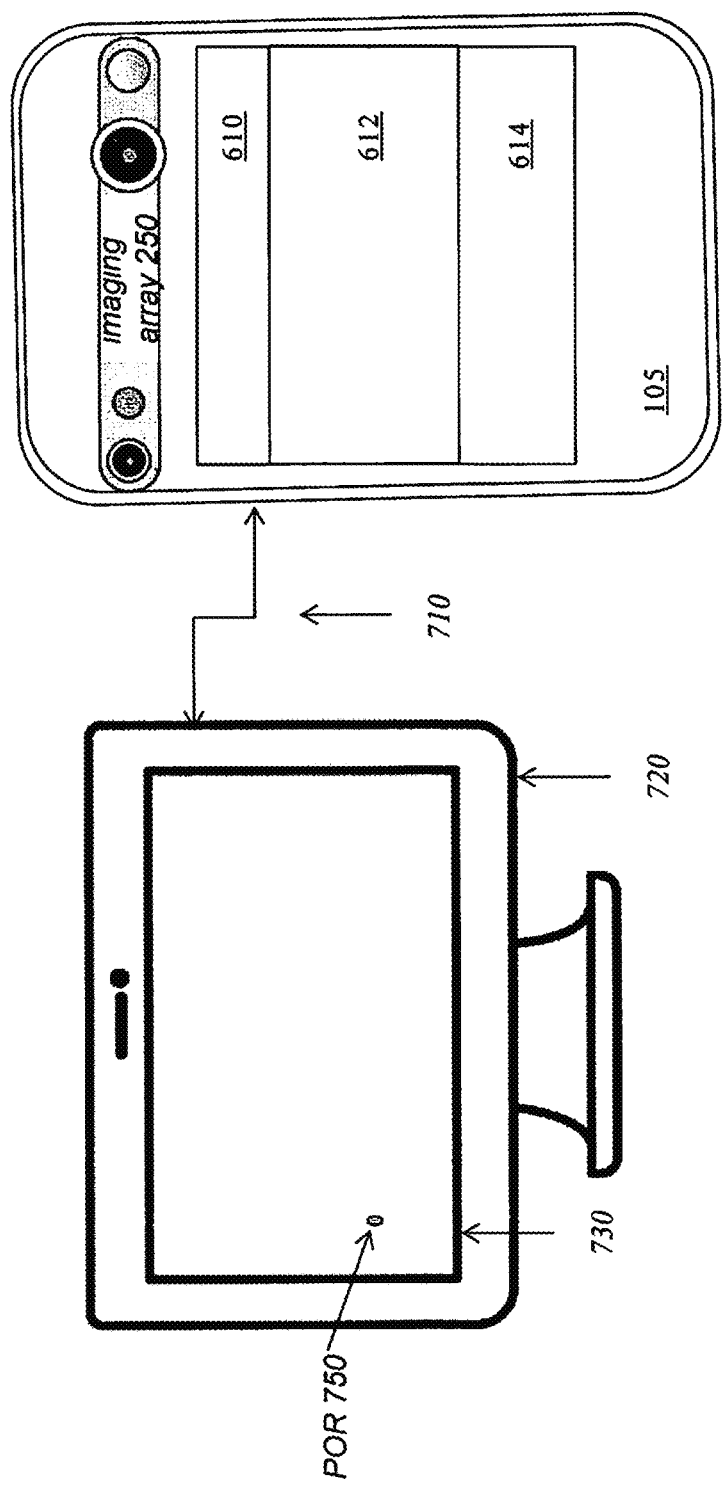
FIG. 7 is a block diagram of an electronic device where remote eye tracking provides POR display at an additional electronic device coupled to the electronic device in accordance with some implementations.

FIG. 7 is a block diagram of an electronic device where remote eye tracking identifies a POR at an additional electronic device coupled to the electronic device including remote eye tracking. As shown in FIG. 7, the electronic device 105 includes the imaging array 250 to implement the remote eye tracking capability, and the electronic device 105 is coupled to a second electronic device 720 shown as a monitor (e.g., second display). In some implementations, the second electronic device 720 can be a computer, PDA, mobile electronic device, smartphone or the like. In various implementations, POR 750 on a display 730 of the second electronic device 720 can be determined using the sensors of or by the electronic device 105. In various implementations, the extrinsic parameters of the electronic device 105 and the display 730 are known so that the gaze direction of the user can be tracked and POR intersections with the display 730 used as described herein. In various implementations, the electronic device 105 is directly or indirectly coupled 710 (e.g., wired or wireless) to the second electronic device 720.

The POR-enabled interactions disclosed herein provide advantages in a variety of circumstances and implementations when used with the device 105 or the second electronic device 720. In some implementations, a mobile electronic device (mobile phone, etc.) uses POR enabled interactions by various implementations described herein to provide focus selection in camera applications. Alternatively, in some implementations, POR enabled by various implementations described herein provides auto-scrolling when the user reaches the bottom of a section, a page or a region of perusable content or text/content selection. In some implementations, POR enabled by various implementations described herein provides feedback or gaze path metrics for user reading/review analysis such as but not limited to detection diagnostics for dyslexia or to determine the extent an opened email was read (e.g., subject line, brief review or word by word review to the end). In some implementations, POR enabled by various implementations described herein provides point of view stabilization (e.g., improve image quality on specific region of a display) or a privacy mode where a portion of the viewed content is not changed, but all other portions of the display are scrambled (e.g., reading text, scramble all words except the word being looked at). In some implementations, POR enabled by various implementations described herein provides enablement/selection (e.g., turn display on and off).

Figure 8:
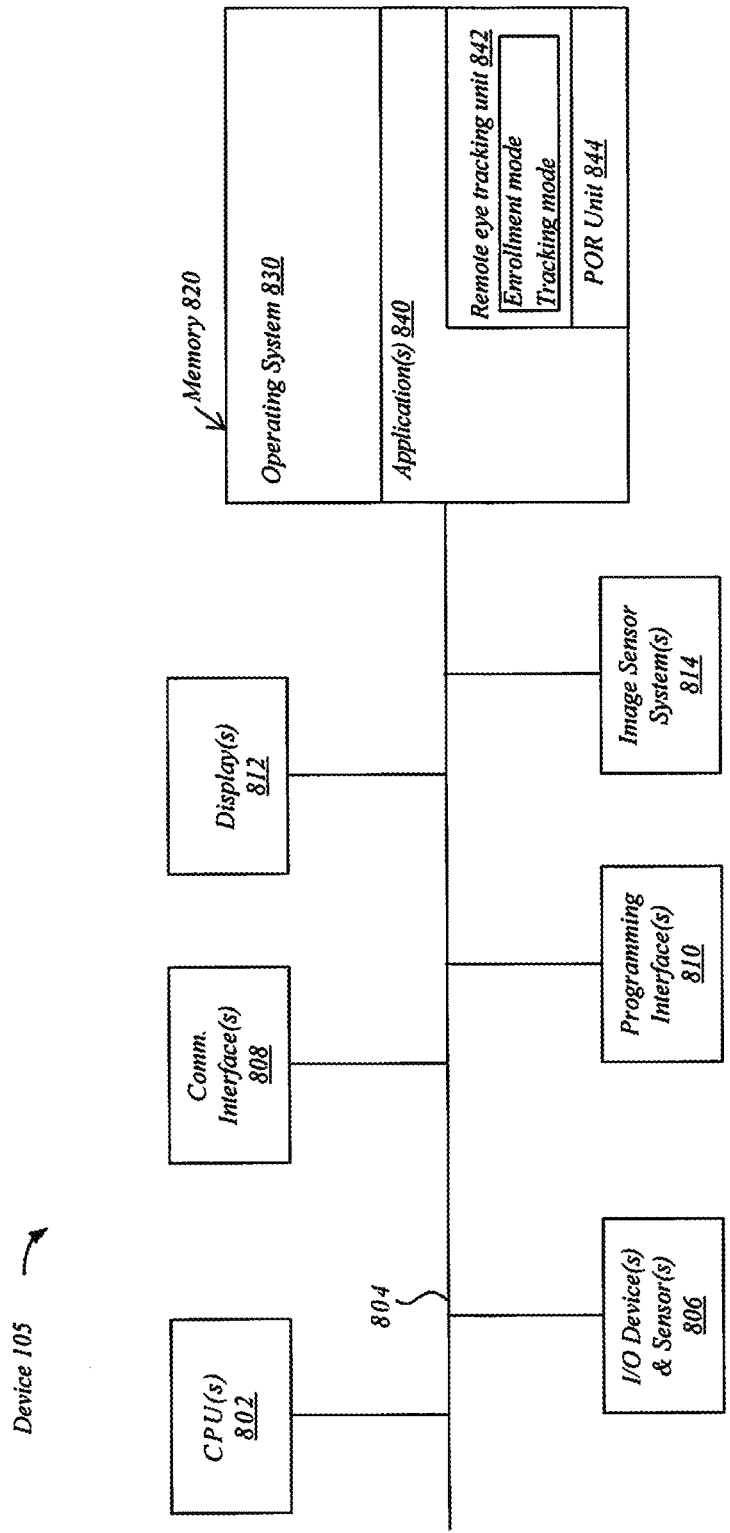
FIG. 8 is a block diagram illustrating device components of an exemplary device according to some implementations.

FIG. 8 is a block diagram illustrating device components of device 105 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 105 includes one or more processing units 802 (e.g., microprocessors, ASICs, FPGAs, GPUs, CPUs, processing cores, or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 810, one or more displays 812, one or more interior or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of a touch screen, a soft key, a keyboard, a virtual keyboard, a button, a knob, a joystick, a switch, a dial, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like. In some implementations, movement, rotation, or position of the device 105 detected by the one or more I/O devices and sensors 806 provides input to the device 105.

In some implementations, the one or more displays 812 are configured to present an MR environment. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 812 correspond to diffractive, reflective, polarized, holographic, etc. waveguide displays. In one example, the device 105 includes a single display. In another example, the device 105 includes an display for each eye. In some implementations, the one or more displays 812 are capable of presenting MR or VR content.

In some implementations, the one or more image sensor systems 814 are configured to obtain image data that corresponds to at least a portion of a scene local to the device 105. The one or more image sensor systems 814 can include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 814 further include illumination sources that emit light, such as a flash. In some implementations, the one or more image sensor systems 814 provide imaging sensors for remote eye tracking.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium. In some implementations, the memory 820 or the non-transitory computer readable storage medium of the memory 820 stores the following programs, modules and data structures, or a subset thereof including an optional operating system 830 and one or more applications 840.

The operating system 830 includes procedures for handling various basic system services and for performing hardware dependent tasks. In some implementations, the operating system 830 includes built in MR functionality, for example, including an MR experience application or viewer that is configured to be called from the one or more applications 840 to display an MR environment within a user interface. In some implementations, the operating system 830 includes built in remote eye tracking functionality.

The applications 840 include an remote eye tracking unit 842 and a POR experience unit 844. The remote eye tracking unit 842 and POR experience unit 844 can be combined into a single application or unit or separated into one or more additional applications or units. The remote eye tracking unit 842 is configured with instructions executable by a processor to perform remote eye tracking using one or more of the techniques disclosed herein. The remote eye tracking unit 842 can include one or both an enrollment mode and a tracking mode using one or more of the techniques disclosed herein. The POR experience unit 844 is configured with instructions executable by a processor to provide the POR functionality at the device 105 or electronic devices coupled thereto.

FIG. 8 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation. In some implementations, block diagram illustrating components of device 105 can similarly represent the components of electronic devices that can be interconnected locally or remotely.

Figure 9:
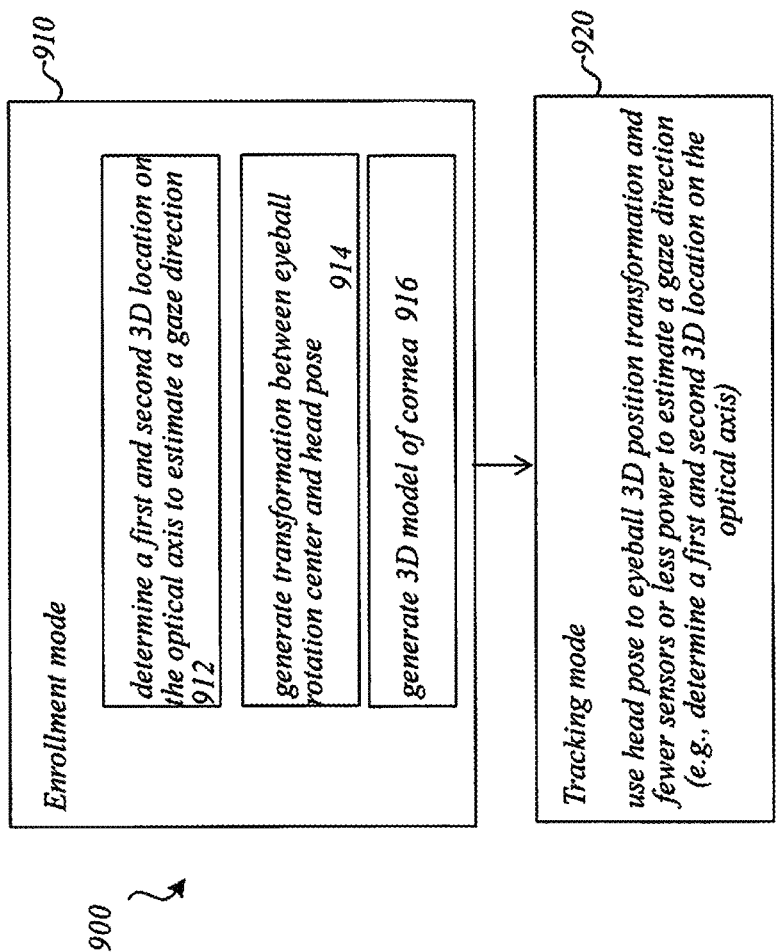
FIG. 9 is a flowchart that shows an example method for remote eye tracking according to some implementations.
Figure 10:
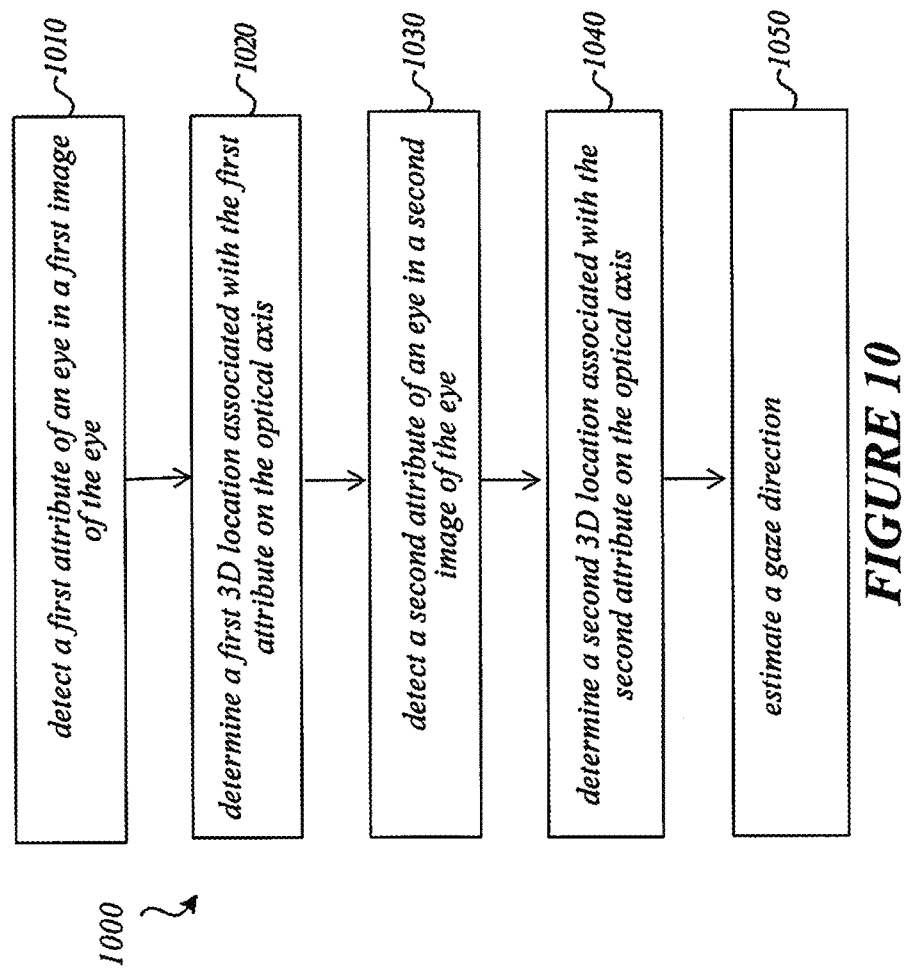
FIG. 10 is a flowchart that shows another example method for remote eye tracking according to some implementations.
Figure 11:
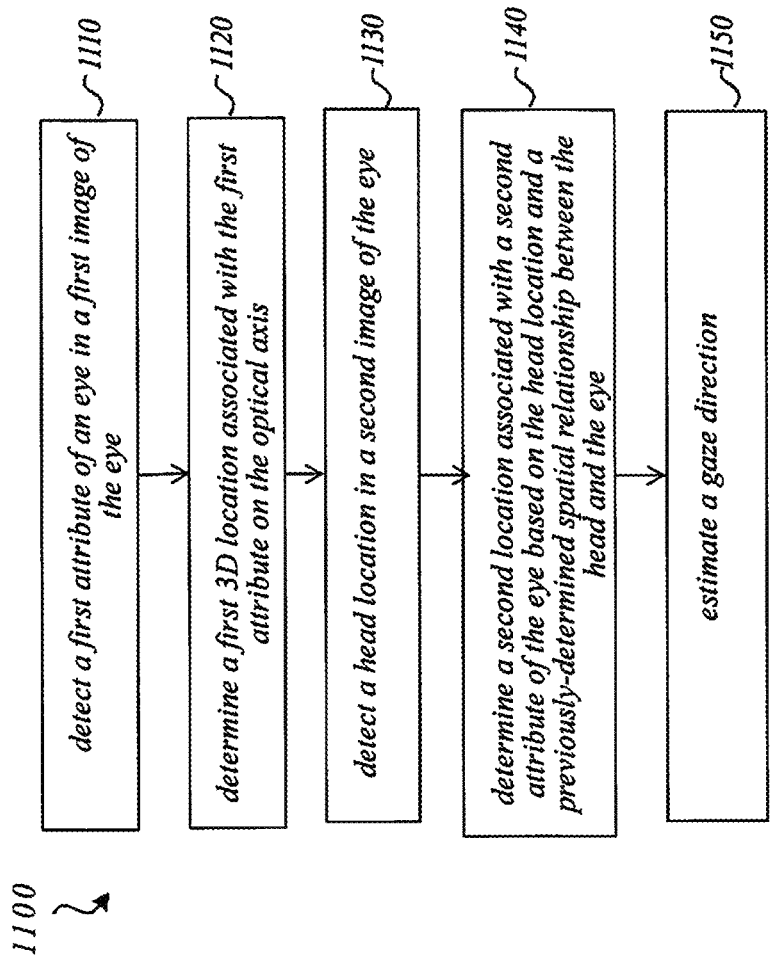
FIG. 11 is a flowchart that shows yet another example method for remote eye tracking according to some implementations.

FIGS. 9-11 are a flowchart representations of methods for remote eye tracking by an electronic device in accordance with some implementations. In some implementations, methods 900, 1000, 1100 are performed by a device (e.g., device 105 of FIGS. 1-2, 6-8). The methods 900, 1000, 1100 can be performed at a mobile device, HMD, desktop, laptop, or server device. In some implementations, the methods 900, 1000, 1100 are performed by processing logic, including hardware, firmware, software, or a combination thereof. In some implementations, the methods 900, 1000, 1100 are performed by a processor executing code stored in a non-transitory computer-readable medium (e.g., a memory).

FIG. 9 is a flowchart representation of an example method for remote eye tracking according to some implementations. As shown in FIG. 9, remote eye tracking can be performed in an enrollment mode of remote eye tracking or in a tracking mode remote eye tracking of an electronic device. In various implementations, the tracking mode uses a known 3D head pose to eyeball 3D position transformation and fewer sensors or less power (than the enrollment mode) to estimate a gaze direction.

At block 910 the method 900 operates in the enrollment mode during remote eye tracking. In various implementations, the enrollment mode determines a current gaze direction (e.g., block 912) by determining 2 positions on an optical axis of the eye.

At block 912, the method 900 determines a current first location (e.g., an 3D eyeball position) along the optical axis in a 3D coordinate system using detected eye feature information and corresponding depth information from a depth sensor. At block 912, the method 900 determines a current second location (e.g., a 3D cornea position) along the optical axis in the 3D coordinate system using detected cornea reflections and corresponding depth information from a depth sensor (e.g., see FIGS. 3-4). At block 912, the method 900 determines a current gaze direction using the current first location and the current second location.

At block 914, the method 900 performs an eyeball reconstruction to establish a transformation from a 3D head position to eyeball rotation center for the user because an eyeball rotation center is uniquely positioned in the head of the user. Once the transformation is determined, detecting a current head position can directly result in a calculated current 3D eyeball rotation center position. In some implementations, a transformation from a 3D head position to the eyeball rotation center is determined as described herein, for example see block 470. In some implementations, the method 900 completely determines the transformation from head pose to eyeball rotation center in the enrollment mode. In some implementations, the relationship between the 3D head position and the eyeball rotation center will be different for every person. In some implementations, the transformation includes coordinating between a first 3D coordinate system for the head position and a second 3D coordinate system for the eye position.

At block 916, the method 900 performs a cornea reconstruction or generates a 3D model of the cornea. In some implementations, the cornea can be detected in an eye region located by detected facial features. In some implementations, depth values can be used to establish a 3D model of the detected cornea in the detected eye region. As shown in FIG. 3, the 3D reconstruction of the cornea 320 is a spherical representation, however, other 3D representations can be used. In some implementations, the 3D model of the detected cornea will be different for every person. In some implementations, the method 900 completes the 3D model of the cornea in the enrollment mode. In some implementations, glints detected by active illumination are used with the cornea model (e.g., surface curvatures, aspect ratio) and corresponding depth information to establish an orientation of the cornea.

At block 920, the method 900 performs remote eye tracking in the tracking mode. At block 920, because the head pose to eyeball center transformation is determined, the tracking mode uses a detected 3D head position to determine the gaze direction. In some implementations, the device 105 turns off the depth sensor and the active illumination source and uses only the feature detection sensor (e.g., RGB camera) in the tracking mode.

In some implementations, at block 920, the method 900 uses only the RGB sensor or images to update the gaze direction in the tracking mode. At block 920, the method 900 determines a first location and a second location along an optical axis to determine a gaze direction. In some implementations, the RGB images are used to determine facial features to determine the current 3D head position (e.g., a head tracker function can determine the head pose). Then, the method 900 uses the transformation and the current updated 3D head position to identify the current updated 3D eyeball rotation center position (e.g., the first location). Also at block 920, the limbus is detected in the RGB images, and used to determine an updated 3D limbus center position. The updated 3D limbus center position is used to update an orientation of the cornea and determine an updated current 3D cornea center position (e.g., the second location). In various implementations, the updated eyeball center 3D position and the updated current 3D cornea center position are used to determine the updated current gaze direction at block 920. In various implementations, the other elements of the imaging array (e.g., imaging array 250) are turned off in the tracking mode. In some implementations, the eyeball center position is assumed to be fixed in position so that the fixed position eyeball rotation center and the updated cornea center position can be used to determine the updated current gaze direction.

Alternatively, in some implementations, at block 920, the RGB images and 2D glint images are used to update the gaze direction in the tracking mode. In some implementations, the RGB images are used to determine facial features to determine the current 3D head position (e.g., a head tracker function can determine the head pose). Then, the method 900 uses the transformation and the current updated 3D head position to identify the current updated 3D eyeball rotation center position (e.g., the first location). Then, at block 920, additional 2D glint images can be used (e.g., with a cornea model) to update an orientation of cornea and determine an updated current 3D cornea center position. In various implementations, the updated the eyeball center 3D position and the updated current 3D cornea center position are used to update the current gaze direction at block 920. In some implementations, the 2D glint images are provided by an IR LED and IR sensor or provided by a red LED and the RGB camera.

In yet other alternative implementations, at block 920 the method 900 uses the RGB images in the tracking mode to determine the limbus 3D pose (e.g., 3D position and orientation). In such implementations, the 3D limbus shape is determined or provided (e.g., modeled in the enrollment mode). Further, a transformation from the 3D limbus pose to the 3D head position (e.g., or to eyeball rotation center) is determined or provided (e.g., modeled in the enrollment mode). Then, a current pose of the limbus can be calculated from the 2D image of the limbus obtained in the tracking mode. For example, if the limbus shape were a circle in a planar surface of a known size, a detected 2D limbus shape that was an ellipse of different detected size having a angled orientation provides enough information to calculate the limbus pose (e.g., 3D position and 2D orientation (pan orientation and tilt orientation). Thus, in some implementations, the 3D position of the limbus can be used for current head pose calculations (e.g., 3D eyeball center position) and the limbus orientation can be used for current cornea calculations (e.g., 3D cornea center position) to update the gaze tracking direction.

Although shown in FIG. 9 as a single progression from the enrollment mode to the tracking mode, in some implementations, the electronic device implementing the method 900 could repeatedly switch between the enrollment mode and the tracking mode. Although, described using RGB images, various implementations in block 910 and 920 can use other combinations of images or images sensors, for example, IR images or IR sensors only.

FIG. 10 is a flowchart representation of another example method for remote eye tracking according to some implementations. At block 1010, the method 1000 detects a first attribute of an eye based on pixel differences associated with different wavelengths of light in a first image of the eye. In some implementations, the limbus or the iris can be identified based on color differences or wavelength differences in an RGB image or a high-resolution structured light pattern IR image. In some implementations, facial landmarks or a facial recognition application can be used to determine a region or an eye region to search for the first attribute.

At block 1020, the method 1000 determines a first location associated with the first attribute in a three dimensional (3D) coordinate system based on depth information from a depth sensor. In various implementations, there exists a mapping from the first images to the depth information or depth images from the depth sensor. In some implementations, the mapping is used to obtain detailed depth information from the corresponding portion of the depth information (e.g., depth map). Using depth information for the first attribute, a 3D position of a feature of the eye is determined such as the limbus or iris plane, a 3D location of the eyeball rotation center in the 3D space is determined. In some implementations, the 3D location of the eyeball rotation center is the first location.

At block 1030, the method 1000 detects a second attribute of the eye based on a glint resulting from light of an illumination source (e.g., an IR flood-illumination source, a red LED and the RGB camera) reflecting off a cornea of the eye. In various implementations, the cornea can be identified based on one or more glint detections.

At block 1040, the method 1000 determines a second location associated with the second attribute in the 3D coordinate system based on the depth information from the depth sensor. In some implementations, the cornea is detected using glints in the IR images, which are used to obtain required depth information from the corresponding portion in the depth map. This results in a location in 3D space of the cornea (e.g., orientation), which can be used to estimate a 3D location of the center of the cornea. In some implementations, the 3D location of the center of the cornea is the second location.

At block 1050, the method 1000 determines a gaze direction in the 3D coordinate system based on the first location and the second location. In some implementations, the first location and the second location are on the optical axis of the eye and a line connecting these two points provides a gaze direction. In some implementations, a direction from the 3D eyeball rotation center to the 3D cornea center provides the gaze direction.

One use of remote eye tracking by the device is to identify a point of regard (POR). In some implementations, the method 1000 implements gaze detection in the enrollment mode of remote eye tracking by the device 105. In some implementations, in blocks 1010 to 1040, the 5D of the eye in space, namely a 3D position and 2D orientation is determined (e.g., 2D orientation includes "pan" and "tilt", but not "roll").

FIG. 11 is a flowchart representation of yet another example method for remote eye tracking according to some implementations. As shown in FIG. 11, at block 1110, the method 1100 detects a first attribute of an eye based on pixel differences associated with different wavelengths of light in a first image of the eye. In some implementations, the limbus or the iris plane can be identified based on color differences or wavelength differences in 2D RGB image(s) or a high-resolution structured light pattern IR image(s).

At block 1120, the method 1100 determines a first location associated with the first attribute in a three dimensional (3D) coordinate system based on depth information from a depth sensor. In various implementations, there exists a mapping from the second images to the depth information or depth images from the depth sensor. In some implementations, the first attribute or the detected limbus in the RGB image is used to obtain depth information from that region in a corresponding depth map. In some implementations, the detected limbus and a 3D eye model are used to determine a orientation of the limbus and a 3D location of the limbus center in the 3D space. From the 3D limbus center position, a 3D location of a center of the cornea can be determined and used for the first location associated with the first attribute.

At block 1130, the method 1100 determines a head location in the three dimensional (3D) coordinate system based on a head (e.g., eye region) detected in at least one second image and the depth information from the depth sensor. In some implementations, the head location is detected in the RGB image and used to obtain depth information for the corresponding region in a depth map. In some implementations, the 3d pose of the head can be determined from facial landmark identified at block 1130.

At block 1140, the method 1100 determines a second location associated with a second attribute of the eye in the 3D coordinate system based on the 3D head pose and a previously-determined spatial relationship between the 3D head pose and the 3D eye model. In some implementations, the transformation between the subject's head position in 3D space and a location of the eye rotation center in the 3D space. In some implementations, this transformation can be individualized to each subject. In some implementations, this transformation can be determined in an enrollment mode or otherwise provided for use by the method 1100. In various implementations, the detected head location and the known head pose-to-eyeball rotation center transformation are used to identify the second location (e.g., 3D location of the eyeball rotation center).

At block 1150, the method 1100 determines a gaze direction in the 3D coordinate system based on the first location and the second location. In some implementations, the first location and the second location are on the optical axis of the eye and a line connecting these two points provides a gaze direction. In some implementations, a direction from the 3D eyeball center to the 3D cornea center provides the gaze direction.

One use of remote eye tracking by the device is to identify a point of regard (POR). In some implementations, the method 1100 implements gaze detection in the tracking mode of remote eye tracking by the device 105.

In some implementations, methods 900, 1000, 1100 can be implemented in an electronic device having an RGB camera, a depth sensor and an active illumination source and detector. In some implementations, methods 900, 1000, 1100 can be implemented in an electronic device having an RGB-D camera, and an active illumination source and sensor. In some implementations, methods 900, 1000, 1100 can be implemented in an electronic device having a color active illumination source and detector.

In various implementations described herein, the device 105 determines a gaze direction of a user (e.g., in enrollment mode, tracking mode, methods 900, 1000, 1100), which can also be used for POR techniques, using a single eye of the user. However, various implementations described herein are not intended to be so limited. For example, in some implementations, the gaze direction can be determined using both eyes of the user. Further, in some implementations, the POR functionality can be determined using two gaze directions, namely, one from each eye of the user. In some implementations, such a stereoscopic gaze direction may not equal an optical axis of either eye.

In various implementations, the device 105 may detect an object and determine its pose (e.g., position and orientation in 3D space) based on conventional 2D or 3D object detection and localization algorithms, visual inertial odometry (VIO) information, infrared data, depth detection data, RGB-D data, other information, or some combination thereof using techniques disclosed herein. In some implementations, the pose is detected in each frame of the captured image 400. In one implementation, after pose detection in a first frame, in subsequent frames of the sequence of frames, the device 105 can determine an appropriate transform (e.g., adjustment of the pose) to determine the pose of the object in each subsequent frame.

In some implementations, VIO is used to determine a location of the real object in a 3D space used by a VIO system based on the location of the real object in the physical environment (e.g., 2 meters in front of the user). In some implementations, the VIO system analyzes image sensor or camera data ("visual") to identify landmarks used to measure ("odometry") how the image sensor is moving in space relative to the identified landmarks. Motion sensor ("inertial") data is used to supplement or provide complementary information that the VIO system compares to image data to determine its movement in space. In some implementations, a depth map is created for the real object and used to determine the pose of the 3D model in a 3D space.

Numerous specific details are set forth herein to provide a thorough understanding of the claimed subject matter. However, those skilled in the art will understand that the claimed subject matter may be practiced without these specific details. In other instances, methods apparatuses, or systems that would be by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the disclosure are to be understood as being in every respect illustrative and exemplary, but not restrictive, and the scope of the disclosure disclosed herein is not to be determined only from the detailed description of illustrative implementations but according to the full breadth permitted by patent laws. It is to be understood that the implementations shown and described herein are only illustrative of the principles of the present disclosure and that various modification may be implemented by those skilled in the art without departing from the scope and spirit of the disclosure.

What is claimed is:

1. A method, comprising:
   at a device having one or more processors, one or more image sensors, and an illumination source,
   detecting a first attribute of an eye based on pixel differences associated with different wavelengths of light in a first image of a head including the eye;
   determining a first location associated with the first attribute in a three dimensional (3D) coordinate system based on head pose detection using depth information from a depth sensor and a spatial relationship between a head pose and a rotation center of the eye;
   detecting a second attribute of the eye based on a glint resulting from light of the illumination source reflecting off a cornea of the eye;
   determining a second location associated with the second attribute in the 3D coordinate system based on the depth information from the depth sensor; and
   determining a gaze direction in the 3D coordinate system based on the first location and the second location.

2. The method of claim 1, wherein the first location is the rotation center of the eye.

3. The method of claim 1, wherein detecting the first attribute comprises:
   detecting facial landmarks in the first image.

4. The method of claim 1, wherein determining the first location is based on
   the head pose detection and a previously-determined spatial relationship between the head and the rotation center of the eye.

5. The method of claim 1, wherein determining the first location comprises:
   locating the rotation center of the eye based on a 3D model of the eye.

6. The method of claim 1, wherein determining the second location comprises:
   locating the cornea using the detected cornea and a depth map from a depth sensor; or
   locating a cornea center.

7. The method of claim 1 further comprising determining a point of regard on the device based on the gaze direction and location of the device.

8. The method of claim 1, wherein the one or more image sensors comprise:
   a red-green-blue (RGB) image sensor, wherein the first image is captured by the RGB image sensor; and
   an infrared (IR) sensor, wherein the second image is captured by the IR sensor.

9. The method of claim 8, wherein the IR sensor is the depth sensor, wherein the IR sensor alternates over time capturing depth information and IR images of glints for cornea detection.

10. The method of claim 8, wherein the IR sensor is the depth sensor, wherein the IR sensor concurrently captures depth information and IR images of glints for cornea detection using structured light emitted from the illumination source that reflects off the eye.

11. The method of claim 1, wherein the one or more image sensors comprise a single infrared (IR) sensor, wherein the first image and second image are captured by the IR sensor, wherein the IR sensor alternates over time capturing first attribute images and second attribute images.

12. The method of claim 1 further comprising:
    determining the head pose in the 3D coordinate system;
    determining the rotation center of the eye in the 3D coordinate system; and
    identifying the spatial relationship between the head pose and the rotation center of the eye.

13. A method, comprising:
    at a device having one or more processors, one or more image sensors, and an illumination source,
    detecting a first attribute of an eye based on pixel differences associated with different wavelengths of light in a first image of the eye;

determining a first location associated with the first attribute in a three dimensional (3D) coordinate system based on depth information from a depth sensor;

determining a head pose in the three dimensional (3D) coordinate system based on a head detected in a second image and the depth information from the depth sensor;

determining a second location associated with a second attribute of the eye based on the head pose and a previously-determined spatial relationship between the head pose and a rotation center of the eye; and determining a gaze direction in the 3D coordinate system based on the first location and the second location.

14. The method of claim 13, wherein detecting the first attribute comprises:
identifying a limbus of the eye based on color differences in an RGB image corresponding to reflected ambient light identifying a limbus of the eye based on differences in an infrared (IR) image corresponding to reflected flood IR light emitted from the illumination source.

15. The method of claim 13, wherein detecting the first attribute comprises:
detecting facial landmarks in the first image;
identifying an eye region of the first image based on the facial landmarks; and
detecting the first attribute in the eye region.

16. The method of claim 13, wherein determining the first location is based on a portion of a depth map corresponding to an eye region of the first image.

17. The method of claim 13, wherein determining the first location comprises:
locating a limbus using the detected first attribute and a depth map from a depth sensor; or
locating a limbus center based on a 3D model of the eye.

18. The method of claim 13, wherein determining the head pose is based on an RGB image, an infrared image, or a feature-matching technique.

19. The method of claim 13 further comprising determining a point of regard on the device based on the gaze direction and a location of the device.

20. An electronic device, comprising:
at least one active illumination source;
a sensor configured to detect depth information in a first image and glints for cornea detection in a second image from reflections of light emitted by the at least one active illumination source; and
one or more processors coupled to the active illumination source and the sensor to provide remote gaze tracking;
where the one or more processors determine a first location associated with a first attribute detected in the first image in a three dimensional (3D) coordinate system based on the depth information;
where the one or more processors determine a second location associated with the detected glints detected in the second image in the 3D coordinate system based on the depth information; and
where the one or more processors determine a gaze direction in the 3D coordinate system based on the first location and the second location,
wherein the first location is determined based on head pose detection using depth information in the first image and a previously-determined spatial relationship between a head pose and a rotation center of the eye.

* * * * *